(12) United States Patent
Husemann et al.

(10) Patent No.: US 7,119,128 B2
(45) Date of Patent: Oct. 10, 2006

(54) METHOD FOR PRODUCING ACRYLATE ADHESIVE MATERIALS

(75) Inventors: Marc Husemann, Hamburg (DE); Stephan Zöllner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 158 days.

(21) Appl. No.: 10/450,365

(22) PCT Filed: Oct. 26, 2001

(86) PCT No.: PCT/EP01/12431

§ 371 (c)(1),
(2), (4) Date: Jan. 12, 2004

(87) PCT Pub. No.: WO02/34805

PCT Pub. Date: May 2, 2002

(65) Prior Publication Data

US 2005/0143544 A1    Jun. 30, 2005

(30) Foreign Application Priority Data

Oct. 27, 2000  (DE) ............................... 100 53 563

(51) Int. Cl.
*C08F 2/46* (2006.01)
(52) U.S. Cl. ................... 522/74; 522/903; 428/349
(58) Field of Classification Search .............. 522/74, 522/903; 428/349
See application file for complete search history.

(56) References Cited

U.S. PATENT DOCUMENTS

| | | | |
|---|---|---|---|
| 951,428 A | 3/1910 | Hart et al. | |
| 3,840,448 A | 10/1974 | Osborn et al. | 204/159.14 |
| 4,181,752 A | 1/1980 | Martens et al. | 427/54.1 |
| 4,968,558 A | 11/1990 | Fisher et al. | 428/345 |
| 5,183,833 A | 2/1993 | Fisher et al. | 522/182 |
| 5,475,038 A * | 12/1995 | Skoultchi | 522/96 |
| 5,772,851 A | 6/1998 | Barwich et al. | 203/49 |
| 6,933,350 B1 * | 8/2005 | Nakagawa et al. | 525/330.3 |

FOREIGN PATENT DOCUMENTS

| | | |
|---|---|---|
| DE | 42 11 448 A1 | 10/1993 |
| DE | 43 13 008 C1 | 11/1994 |
| DE | 43 40 136 A1 | 6/1995 |

OTHER PUBLICATIONS

Abstract, Database WPI, Derwent Publications Ltd., London, GB AN 313331, XP002189320, "Production of Solvent Type Acrylic Tacky . . .", & JP 04 220485 A (Sekisui Chem. Ind. Co. Ltd.) Aug. 11, 1999.

* cited by examiner

*Primary Examiner*—Robert D. Harlan
(74) *Attorney, Agent, or Firm*—Norris McLaughlin & Marcus PA

(57) ABSTRACT

A process for preparing pressure sensitive adhesives based on acrylate hotmelt, in which a monomer mixture including at least the following monomers
(a) 70 to 100% by weight of compounds from the group of (meth)acrylic acid and the derivatives thereof corresponding to the following general formula

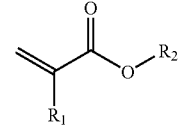

is free-radically polymerized in solution wherein
I. the polymerization is initiated using at least one dissociating photoinitiator and by irradiation with ultraviolet light, the photoinitiator being added to the monomer mixture before the beginning of the polymerization and/or to the reaction mixture in the course of the polymerization,
II. the polyacrylate is freed from the solvent,
III. the polyacrylate is processed further in the melt.

12 Claims, No Drawings

METHOD FOR PRODUCING ACRYLATE ADHESIVE MATERIALS

The invention relates to a process for preparing acrylic hotmelts by free-radical addition polymerization and also to the use of such an acrylic hotmelt.

Within the field of pressure sensitive adhesives (PSAs), as a result of ongoing technological developments in the coating process, there exists a continuing demand for innovative developments. In industry, hotmelt processes with solvent-free coating technology are of growing importance for the preparation of PSAs, since the environmental impositions are becoming ever greater and the prices of solvents continue to rise. Consequently solvents are to be eliminated as far as possible from the manufacturing operation for PSA tapes. As a result of the associated introduction of the hotmelt technology, the requirements imposed on the adhesives are becoming evermore stringent. Acrylic PSAs in particular are being investigated very intensively with a view to their improvement. For high-grade industrial applications there is a preference for polyacrylates, on account of their transparency and stability to weathering. Besides these advantages, however, these acrylic PSAs must also meet exacting requirements in the areas of shear strength and of bond strength.

Acrylic PSAs can be prepared with great individuality. They can be employed very variably, since a large number of different comonomers are available for polymerization and since the adhesive properties of the polyacrylate can be varied through the choice of the (co)monomer composition. Comonomers used include as principal components commonly alkyl esters of acrylic and methacrylic acid, in smaller fractions usually (additionally) acrylic acid, methacrylic acid, acrylamides, maleic anhydride, hydroxy acrylates or itaconic acid. These polyacrylates are prepared using free-radical addition polymerization in solution or in emulsion. Both techniques are subject, among other things, to the problems depicted below, but are very cost-effective and have therefore long been carried out in production.

For processing as a hotmelt PSA it is necessary to remove the solvent. For emulsion polymers this is a very energy-intensive operation, since water has a low vapor pressure and is therefore very difficult to evaporate. Moreover, emulsifiers which remain in the polymer are disruptive, raising the sensitivity of the resultant PSA to water.

In the case of solution polymers it is desirable to lower the solvent fraction. Here, however, the conventional methods are limited, since the polymerization is normally initiated thermally. During the polymerization it is necessary to remove the developing heat of reaction by way of evaporative cooling. Since the initiators generally used for the polymerization are azo initiators having decomposition half-lives of approximately 1 hour at T>60° C., moreover, fractions of initiator remain in the polymer and are then present even after the concentration operation as well. These residual initiators may give rise to a variety of problems. On the one hand it is possible, in the course of melt coating at very high temperatures, for a large fraction of the residual initiators to decompose. The nitrogen gas which is liberated produces bubbles within the PSA, which are undesirable for the quality of the product. On the other hand, polyfunctional acrylates are added in order to ensure that the acrylic PSA is crosslinkable by electron beams. These acrylates are particularly essential for resin-blended acrylic PSAs. In the course of coating not only is there generation of bubbles by the residual initiators but also the free radicals formed react with the polyfunctional acrylates and so bring about an additional, uncontrolled crosslinking of the acrylic PSA. This gelling, as it is known, has an adverse influence on coating. The partly gelled adhesive can no longer be applied as a coating, and, moreover, relatively solid areas with increased gelling may form in the adhesive, and adversely affect the adhesive properties of the PSA tape.

One solution is the UV polymerization of acrylates. U.S. Pat. No. 3,840,448 polymerized acrylates and crosslinked them by the irradiation of UV light. The polymers prepared were not, however, used for PSAs.

U.S. Pat. No. 4,181,752 prepares UV prepolymers which following application as a coating to the backing are polymerized to full conversion and crosslinked. U.S. Pat. No. 4,968,558 and U.S. Pat. No. 5,183,833 likewise prepared PSAs from acrylates and vinyl compounds by way of the prepolymerization technique. Prepolymerization was practised therein using UV-B lamps in conjunction with Irgacure 651™ (benzil dimethyl ketal, Ciba Geigy). The prepolymerization technique is already very widespread but is also hampered by problems. A high monomer content syrup has to be applied to the backing material; only on the backing material is polymerization carried out to high conversion. Because of this operation, only very slow web speeds can be achieved; moreover, the residual monomer fraction in the adhesive is relatively high. Furthermore, the incorporation of resins causes problems, since crosslinking is generally carried out using UV light and many resins of industrial importance absorb UV light and so act as regulators.

It is an object of the invention, therefore, to offer a process for preparing acrylic pressure sensitive adhesives which does not have the abovementioned disadvantages of the prior art. In particular it ought to be possible to achieve a high conversion as early as during polymerization in solution without subsequent gelling processes occurring in the resulting acrylate composition. The adhesive properties of the acrylate composition ought not to fall below a level which is necessary for its technical application.

This object is achieved, surprisingly and unforeseeably for the skilled worker, by a process as set out in the main claim. The subclaims relate to advantageous developments of the invention and also to a use for the pressure sensitive adhesives prepared.

The invention accordingly provides a process for preparing pressure sensitive adhesives based on acrylate hotmelt, in which a monomer mixture including at least the following monomers (a) 70 to 100% by weight of compounds from the group of the (meth)acrylic esters corresponding to the following general formula

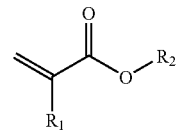

with $R_1$=H or $CH_3$ and $R_2$=an alkyl chain having 2 to 20 carbon atoms and also including (b) 0 to 30% by weight of olefinically unsaturated monomers containing functional groups and also including (c) if desired, further components is free-radically polymerized in solution to give a polyacrylate, and in which I. the polymerization is initiated using at least one dissociating photoinitiator and by irradiation with ultraviolet light, the photoinitiator being added to the monomer mixture before the beginning of the polymerization and/or to the reaction mixture in the course of the polymerization, II. the polyacrylate is freed from the solvent.

III. the polyacrylate is processed further in the melt.

The composition of the corresponding comonomers is preferably chosen so that the resultant PSAs possess pressure sensitive adhesive properties in accordance with D. Satas [Handbook of Pressure Sensitive Adhesive Technology, 1989, Verlag VAN NOSTRAND REINHOLD, New York]. The static glass transition temperature of the PSA is therefore below 25° C.

For the inventive process for preparing the PSAs the comonomers used (component (b)) include olefinically unsaturated compounds which preferably contain functional groups, with a fraction of 0–30 percent by weight. Examples of such olefinically unsaturated compounds are (meth) acrylic acid and the methyl esters thereof, methacrylic acid derivatives such as (meth)acrylamides, N-substituted (meth) acrylamides, dimethylacrylic acid, trichloroacrylic acid, hydroxyalkyl (meth)acrylate, amino-containing (meth)acrylates, hydroxy-containing (meth)acrylates, with particular preference 2-hydroxyethyl (meth)acrylate, 2-hydroxypropyl (meth)acrylate, and/or 4-hydroxybutyl(meth)acrylate, acrylonitrile, and also vinyl compounds such as vinyl esters, vinyl ethers, vinyl halides, vinylidene halides, and nitriles of ethylenically unsaturated hydrocarbons, vinyl compounds with aromatic rings and heterocycles in $\alpha$ position, particularly vinylacetic acid and vinyl acetate, N-vinylformamide, vinylpyridine, ethyl vinyl ether, vinyl chloride, vinylidene chloride, and also maleic anhydride, styrene, styrene compounds, $\beta$-acryloyloxypropionic acid, fumaric acid, crotonic acid, aconitic acid and/or itaconic acid; the above list is only exemplary and not conclusive.

As photoinitiators it is possible to use all Norrish type I photoinitiators (also referred to hereinbelow for short as type I photoinitiators). The fraction of the photoinitiators, based on the monomers used, is advantageously between 0.1 and 2, preferably between 0.25 and 1 percent by weight. With preference it is possible, for example, to use Irgacure 651™ or Irgacure 819™ (Ciba Geigy). Photoinitiator mixtures as well are very suitable for initiation in the inventive sense. Great preference is given to using photoinitiators with longwave absorption, since these possess a great depth of penetration and therefore penetrate the monomer/polymer mixture more readily.

For linear polymerization it is preferred to carry out initiation using a Norrish type I photoinitiator. Norrish type II photoinitiators (type II photoinitiators) cause a greater level of grafting reactions (for the preparation of branched polyacrylates) and are therefore metered in preferably in the course of the UV polymerization. Nevertheless, UV polymerizations can also be initiated using type II photoinitiators.

Norrish type I photoinitiators are those compounds which dissociate in accordance with a Norrish type I reaction when irradiated with light. Such a reaction is, conventionally, the photofragmentation of a carbonyl compound in the course of which the bond to a carbon atom located a to the carbonyl group is free-radically cleaved ($\alpha$ cleavage), so forming an acyl radical and an alkyl radical.

In the inventive sense, the Norrish photoinitiators also include those in which instead of the carbonyl group another functional group is present and cleavage affects the bond between this group and an a carbon atom.

Norrish type II photoinitiators dissociate on irradiation with light in accordance with a Norrish type II reaction involving hydrogen abstraction, which is an intramolecular reaction.

In the case of aliphatic ketones it is possible in this instance for a hydrogen to be eliminated from the $\gamma$ position to one corresponding to the above-depicted functional group.

Inventive examples of Norrish photoinitiators of both types are benzophenone, acetophenone, benzil, benzoin, hydroxyalkylphenone, phenyl cyclohexyl ketone, anthraquinone, thioxanthone, triazine or fluorenone derivatives, without wishing to impose any unnecessary restriction by giving this list. The type I initiators include in particular aromatic carbonyl compounds, such as benzoin derivatives, benzil ketals, and acetophenone derivatives. Type II photoinitiators are in particular aromatic ketones, such as benzophenone, benzil or thioxanthones, for example.

For further details see, for example, Römpp Lexikon Chemie—Version 2.0, Stuttgart/New York: Georg Thieme Verlag 1999.

The polymerization for preparing the acrylic PSA can be conducted in polymerization reactors, which are generally provided with a stirrer, two or more feed vessels, a reflux condenser, heating and cooling and are equipped for operation under $N_2$ atmosphere and superatmospheric pressure. Moreover, a UV irradiation means should be integrated in the reactor.

The UV light is advantageously irradiated into the reactor from above. For mixing it is preferred to use a propeller stirrer which ensures vertical mixing. Effective distribution of the radicals formed in the reaction mixture promotes the polymerization, whereas if mixing is poor the polymerization results are likely to be unsatisfactory, owing to the limited depth of penetration of the UV light into the reaction mixture.

The polymerization proceeds favorably in accordance with a free-radical mechanism. The monomer mixture is irradiated with UV light preferably under an inert gas atmosphere, such as nitrogen, helium or argon, for example.

The free-radical polymerization can be conducted in the presence of one or more organic solvents and/or in the presence of water or in bulk, with preference being given to polymerization in the presence of at least one organic solvent; in that case, it is advantageous to use as little solvent as possible. The polymerization time—depending on conversion and temperature—is between 1 and 24 h.

In the case of solution polymerization it is preferred as solvents to use esters of saturated carboxylic acids (such as ethyl acetate), aliphatic hydrocarbons (such as n-hexane or n-heptane), ketones (such as acetone or methyl ethyl ketone), special boiling point spirit or mixtures of these solvents. For the polymerization it is also possible to use thiols, nitroxides, TEMPO derivatives (TEMPO=2,2,6,6-tetramethyl-1-piperidinyloxy pyrrolidinyloxyl)) or thioesters of any of a wide variety of kinds as further regulators for lowering molecular weight and reducing polydispersity. Also effective as polymerization regulators, as they are known, are alcohols and ethers.

In one very favorable version of the inventive process the irradiation with ultraviolet light is carried out not continuously but instead in the form of one or more irradiation cycles. By means of the irradiation cycles of the UV source it is possible to control the polymerization with regard to the products formed. To control the polymerization it may be appropriate not to irradiate continuously. In that case the sequence of irradiation times and dark times can be chosen advantageously. By means of corresponding irradiation cycles it is possible to control the conversion and hence also the amount of heat produced. The molecular weight distribution as well can be influenced by the irradiation cycle. Particularly advantageous is the irradiation of the monomers to be polymerized with a defined pulse. This method results in the formation only of a very few radicals which are able to react. By means of the UV pulse, accordingly, it is possible to control the number of radicals produced and hence also to adjust the monomer/radical ratio. With a constant ratio of monomer concentration to radical concentration it is possible using this technique to prepare polyacrylate PSAs with a narrow distribution.

On the other hand it is also possible very rapidly to generate a high concentration of radicals, which produce a high conversion. UV-initiated polymerizations therefore proceed much more quickly and economically than conventional polymerizations using azobisisobutyronitrile (AIBN) as initiator.

A further advantage is the simple process technique. Thermally initiated free radical polymerizations with AIBN, for example, generate heat in the course of the polymerization, as a result of which the dissociation of AIBN is accelerated and the number of free radicals formed increased. In the critical case the polymerization may "run away", i.e., become uncontrollable. UV polymerization, in contrast, possesses the advantage that by not irradiating the monomer solution no new free radicals are formed and therefore the polymerization can be controlled more easily.

Depending on the solvent and the photoinitiator used the wavelength to be irradiated is chosen between 200 and 400 nm. By way of example it is possible to use standard commercial high-pressure or medium-pressure mercury lamps with an output of, for example, 80 to 200 W/cm.

The free-radical polymerization is advantageously conducted at least up to a conversion of 98% of the monomers.

The polymer is subsequently freed from the solvent in a concentrating extruder. It is preferred here to use a twin-screw extruder operated either counterrotatingly or corotatingly. The volatile fraction remaining in the polymer should amount to less than 0.5 weight fraction. The polymer is preferably concentrated under low shear. Through the process of the invention it is also possible for the concentrating extruder to be operated at high temperatures without formation of free radicals as a result of thermal initiators dissociating.

To improve the adhesive properties it is preferred to admix resins to the acrylate hotmelt. Examples of resins which can be used include terpene resins, terpene-phenolic resins, $C_5$— and $C_9$-hydrocarbon resins, pinene resins, indene resins, and rosins, alone and also in combination with one another. In principle, however, it is possible to use any resins which are soluble in the corresponding polyacrylate; reference may be made in particular to all aliphatic, aromatic, and alkylaromatic hydrocarbon resins, hydrocarbon resins based on single monomers, hydrogenated hydrocarbon resins, functional hydrocarbon resins, and natural resins.

It is additionally possible to add various extenders (for example, carbon black, $TiO_2$, solid or hollow beads of glass or other materials), nucleating agents, compounding agents, ageing inhibitors, light stabilizers, ozone protectants, fatty acids, plasticizers, nucleating agents, blowing agents, accelerators and/or fillers.

For some applications as a pressure sensitive adhesive it can be necessary to crosslink the polymer, particularly for the purpose of increasing the cohesion. For the inventive process it is therefore very advantageous to add crosslinkers to the monomer mixture, to the reaction mixture or to the polyacrylate.

As crosslinkers it is possible to use any difunctional or polyfunctional compounds known to the skilled worker, whose functional groups are able to undergo linking reactions with the polyacrylates, particularly addition polymerization reactions, polycondensation reactions or polyaddition reactions. Use is made in particular of difunctional or polyfunctional acrylates and/or methacrylates, difunctional or polyfunctional isocyanates or difunctional or polyfunctional epoxides. For UV or EB curing, polyfunctional acrylates are preferred. The crosslinkers are preferably metered into the acrylic hotmelt in the melt.

It is also possible to meter in, or to admix to the acrylate melt, substances which crosslink under UV radiation, such as UV photoinitiators, for example. As photoinitiators it is possible to use benzophenone, acetophenone, benzil, benzoin, hydroxyalkylphenone, phenyl cyclohexyl ketone, anthraquinone, thioxanthone, triazine, or fluorenone derivatives, this list not being conclusive. It is preferred to use type II photoinitiators. It is also possible, furthermore, to admix any promoters known to the skilled worker to the acrylic hotmelt which might make UV crosslinking more efficient.

The pressure sensitive adhesive prepared by the process of the invention is suitable with particular advantage for the preparation of, for example, adhesive tapes. For this purpose the acrylic hotmelt is applied from the melt to a backing in the form of the substance as it is or in a form modified as already described.

As backing materials, for adhesive tapes, for example, it is possible in this case to use the materials customary and familiar to the skilled worker, such as films (polyesters, PET, PE, PP, BOPP, PVC), nonwovens, foams, woven fabrics and woven films, and also release paper (glassine, HDPE, LDPE). This list is not conclusive.

Following application, the crosslinking can then be carried out in the inventive sense, preferably directly on the backing material, preferably by means of UV radiation or by means of ionizing radiation, such as electron beams, for example. In special circumstances it is also possible to carry out thermal crosslinking as well.

For UV crosslinking, irradiation takes place in a wavelength range from 200 to 400 nm using standard commercial high-pressure or medium-pressure mercury lamps having an output of, for example, 80 to 200 W/cm. For UV crosslinking it may be appropriate to adapt the lamp output to the web speed or to carry out partial shading of the web in slow travel in order to reduce the thermal load thereon. The irradiation time is guided by the construction and output of the respective lamps. Moreover, it is preferred to carry out irradiation under an inert gas atmosphere.

The content of the invention further includes the use of the resultant pressure sensitive adhesive for an adhesive tape, it being possible for the adhesive tape to be provided with a self-adhesive layer on one or both sides.

EXAMPLES

The invention is illustrated below by examples, without wishing to subject it to any unnecessary restriction as a result.

A selection is made of acrylic monomers and vinyl monomers depending on the desired adhesive properties of the acrylic hotmelts.

Test Methods

The following test methods were employed to evaluate the adhesive properties of the PSAs prepared.

Shear Strength (Test A)

A strip 13 mm wide of the adhesive tape was applied to a smooth steel surface which had been cleaned three times with acetone and once with isopropanol. The area of application measured 20 mm×13 mm (length×width). The adhesive tape was then pressed onto the steel backing four times with a weight of 2 kg. At room temperature a weight of 1 kg was fastened to the adhesive tape, and the time taken for the weight to fall down was measured.

The shear stability times measured are indicated in minutes and correspond to the average of three measurements.

180° Bond Strength Test (Test B)

A strip 20 mm wide of an acrylic PSA applied to a polyester was applied to steel plates which had been washed beforehand twice with acetone and once with isopropanol. For the measurements on the PE substrate only new plates were used.

The PSA strip was pressed down twice onto the substrate using a 2 kg weight. The adhesive tape was then removed immediately from the substrate at a speed of 300 mm/min and at an angle of 180°. All measurements were conducted at room temperature under climatized conditions.

The results are reported in N/cm and are averaged from three measurements.

Determination of the Gel Fraction (Test C)

The carefully dried solvent-free adhesive samples are welded into a pouch of polyethylene nonwoven (Tyvek web). From the difference in the sample weights before and after extraction with toluene the gel value is determined, i.e., the weight fraction of the polymer that is not soluble in toluene.

Samples Investigated

Commercially available substances used

| Substance | Manufacturer | Chemical composition |
| --- | --- | --- |
| Irgacure 819 | Ciba Specialty Chemicals | Bis(2,4,6-trimethylbenzoyl)phenyl-phosphine oxide |
| Irgacure 651 | Ciba Specialty Chemicals | Benzyl dimethyl ketal |
| Vazo 67 | DuPont | 2,2'-azobis(2-ethylpropiononitrile) |
| Perkadox 16 | Akzo Nobel | Bis(4-tert-butylcyclohexyl) peroxydicarbonate |
| Genomer 4212 | Rahn | Aliphatic polyurethane acrylate with a functionality of 2 |
| PETIA | UCB | Pentaerythritol triacrylate |
| SR 610 | Sartomer | Polyethylene glycol diacrylate with a degree of polymerization of 14 |
| Norsolene M1080 | Cray Valley | Partially hydrogenated HC resin |
| DT 110 | DRT | Terpene-phenolic resin |

Example 1

A mixture of 40 g of acrylic acid, 360 g of 2-ethylhexyl acrylate and 400 g of acetone was blended with 2 g of Irgacure 819™ (Ciba Geigy) and rendered inert with nitrogen gas for 45 minutes in a conventional 2 l reactor with a propeller stirrer. The polymerization was initiated using a Bluepoint™ UV radiation source (340 nm wavelength, Spectrum). Irradiation was carried out from above into the monomer solution. The irradiation sequence was chosen in accordance with the following program:

| Time | Duration | Irradiation sequence |
| --- | --- | --- |
| Start to 20 min | 19.5 min | In each case 30 s irradiation, 60 s without irradiation |
| up to 1 h | 40 min | In each case 30 s irradiation, 30 s without irradiation |
| up to 2 h | 60 min | In each case 60 s irradiation, 30 s without irradiation |

The polymer was freed from the solvent in a drying cabinet under reduced pressure at a temperature of 50° C. Thereafter the polymer was coated at a rate of 50 g/m² onto a Saran-primed PET film 23 µm thick through a slot die heated to 170° C. The PSA had a bubbly appearance. The adhesive tape was subsequently crosslinked with electron beams (dose 15 kGy) with an acceleration voltage of 230 kV using an electron beam unit from Crosslinking.

The adhesive properties were analyzed by conducting test methods A and B.

Reference Example 2

A 2 l glass reactor conventional for free-radical polymerizations was charged with 40 g of acrylic acid, 360 g of 2-ethylhexyl acrylate and 300 g of acetone/isopropanol (97:3). After nitrogen gas had been passed through the reactor for 45 minutes the reactor was heated to 58° C., with stirring using an anchor stirrer, and 0.2 g of Vazo 67™ (DuPont) was added. The external heating bath was then heated to 75° C. and the reaction was carried out constantly at this external temperature. After reaction times of 1 h and 1.5 h a further 0.2 g of Vazo 67™ was added. After 3 h and 6 h dilution was carried out with in each case 150 g of acetone/isopropanol mixture (97:3). After 16 h the residual initiators were reduced by dropwise addition of 0.4 g of Perkadox 16™ (Akzo Nobel) as a solution in 10 g of acetone. The reaction was terminated after a time of 22 h and the product cooled to room temperature.

The polymer was freed from the solvent in a drying cabinet under reduced pressure at a temperature of 50° C. Thereafter the polymer was coated at a rate of 50 g/m² onto a Saran-primed PET film 23 µm thick through a slot die heated to 170° C. The PSA had a smooth appearance. The adhesive tape was subsequently crosslinked with electron beams (dose 15 kGy) with an acceleration voltage of 230 kV using an electron beam unit from Crosslinking.

The adhesive properties were analyzed by conducting test methods A and B.

Example 3

A mixture of 4 g of acrylic acid, 32 g of N-tert-butylacrylamide, 4 g of maleic anhydride, 180 g of 2-ethylhexyl acrylate, 180 g of n-butyl acrylate and 400 g of acetone was blended with 2 g of Irgacure 819™ (Ciba Geigy) and rendered inert with nitrogen gas for 45 minutes in a conventional 2 l reactor having a propeller stirrer. The polymerization was initiated using a Bluepoin™ UV radiation source (340 nm wavelength, Spectrum).

Radiation was carried out from above into the monomer solution, proceeding in analogy to the irradiation program in Example 1.

The polymer was blended in acetone with 30 weight fractions of DT 110™ (DRT) and 1 weight fraction of SR 610 (Sartomer) and was freed from the solvent in a drying cabinet under reduced pressure at a temperature of 50° C. Thereafter the polymer was coated at a rate of 100 g/m² to a Saran-primed PET film 23 µm thick via a slot die heated to 170° C. The adhesive tape was subsequently crosslinked with electron beams (dose 50 kGy) at an acceleration voltage of 230 kV using an electron beam unit from Crosslinking. The adhesive properties were analyzed by conducting test methods A and B. In parallel thereto a specimen was stored in the drying cabinet at 140° C. for 8 hours and then test method C was carried out.

Reference Example 4

A 2 I glass reactor conventional for free-radical polymerizations was charged with 40 g of acrylic acid, 360 g of 2-ethylhexyl acrylate and 300 g of acetone/isopropanol (97:3). After nitrogen gas had been passed through the reactor for 45 minutes the reactor was heated to 58° C., with stirring using an anchor stirrer, and 0.2 g of Vazo 67™ (DuPont) was added. The external heating bath was then heated to 75° C. and the reaction was carried out constantly at this external temperature. After reaction times of 1 h and 1.5 h a further 0.2 g of Vazo 67™ was added. After 3 h and 6 h dilution was carried out with in each case 150 g of acetone/isopropanol mixture (97:3). After 16 h the residual initiators were reduced by dropwise addition of 0.4 g of Perkadox 16™ (Akzo Nobel) as a solution in 10 g of acetone. The reaction was terminated after a time of 22 h and the product cooled to room temperature.

The polymer was blended in acetone with 30 weight fractions of DT 110™ (DRT) and 1 weight fraction of SR 610 (Sartomer) and was freed from the solvent in a drying cabinet under reduced pressure at a temperature of 50° C. Thereafter the polymer was coated at a rate of 100 g/m² onto a Saran-primed PET film 23 µm thick through a slot die heated to 170° C. The adhesive tape was subsequently crosslinked with electron beams (dose 15 kGy) with an acceleration voltage of 230 kV using an electron beam unit from Crosslinking.

The adhesive properties were analyzed by conducting test methods A and B. In parallel thereto a specimen was stored in the drying cabinet at 140° C. for 8 hours and then test method C was carried out.

Example 5

The procedure of Example 3 was repeated. The polymer prepared by UV polymerization was blended with 30 weight fractions of Norsolene M1080™ (Cray Valley) and 1 weight fraction of Genomer 4212™ (Rahn).

Reference Example 6

The procedure of Example 4 was repeated. The polymer prepared by UV polymerization was blended with 30 weight fractions of Norsolene M1080™ (Cray Valley) and 1 weight fraction of Genomer 4212™ (Rahn).

Example 7

The procedure of Example 3 was repeated. UV polymerization was carried out using 2% of acrylic acid, 49% of 2-ethylhexyl acrylate and 49% of n-butyl acrylate. The polymer was blended with 30 weight fractions of Norsolene M1080™ (Cray Valley) and 1 weight fraction of PETIA™ (UCB).

Reference Example 8

The procedure of Example 4 was repeated. UV polymerization was carried out using 2% of acrylic acid, 49% of 2-ethylhexyl acrylate and 49% of n-butyl acrylate. The polymer was blended with 30 weight fractions of Norsolene M1080™ (Cray Valley) and 1 weight fraction of PETIA™ (UCB).

Results

Comparison of Examples 1 and 2 illustrates that residual initiators which remain in the polymer, such as Vazo 67™ from Du Pont, for example, produced constituents in the PSA which dissociate at high temperatures in the course of the coating operation and so give rise to nitrogen bubble inclusions. Through UV-initiated polymerization this can be ruled out (see Example 1).

As a result of the UV-initiated polymerization, moreover, a different molecular weight and also a different molecular weight distribution are achieved. This is reflected in the different adhesive properties. Moreover, in Example 2, the adhesive properties are also adversely affected by the bubbly appearance (see Table 1).

TABLE 1

| Example | BS steel [N/cm] | SST, 10 N [min] | EB dose [kGy] |
|---|---|---|---|
| 1 | 3.8 | >10,000 | 15 |
| 2 | 3.9 | 6,795 | 15 |

50 g/m² application rate
SST: Shear stability time at RT
BS: Bond strength

Example 1 exhibits a much higher shear strength for the same crosslinking dose.

In Examples 3 to 8 the gelling behavior due to the residual initiators was investigated. Investigations were carried out exclusively on polymers blended with resin. Additionally, different polyfunctional acrylates were added in order to ensure electron beam crosslinkability.

For each example, as a reference, a polymer prepared conventionally by a thermally free-radical polymerization was executed. All examples were first subjected to thermal storage, and then the gel value was measured. The results are listed in Table 2.

TABLE 2

| Example | Gel value [%] |
|---|---|
| 3 | 0 |
| 4 | 5 |
| 5 | 0 |
| 6 | 8 |
| 7 | 0 |
| 8 | 14 |

Table 2 shows that for all of the UV-initiated polymerizations, independently of the resin used or of the crosslinker, no gel fraction could be detected. The reference specimens prepared in comparison thereto, in contrast, had a gel fraction of 5 to 14%—a fraction which does not allow clean coating from the melt in the hotmelt operation.

Furthermore, the adhesive properties of the specimens prepared were compared with one another after the coating operation in Table 3.

TABLE 3

| Example | BS steel [N/cm] | SST, 10 N [min] | EB dose [kGy] |
|---|---|---|---|
| 3 | 11.4 | 5,145 | 50 |
| 4 | 12.1 | 3,320 | 50 |
| 5 | 9.4 | 4,765 | 50 |
| 6 | 10.1 | 2,920 | 50 |
| 7 | 10.2 | 3,005 | 40 |
| 8 | 10.6 | 1,855 | 40 |

100 g/m² application rate
SST: Shear stability time at RT
BS: Bond strength

There is hardly any variation in the adhesive properties of the examples depicted. The specimens prepared by UV-initiated polymerization possess a somewhat higher shear strength. On the other hand, the bond strength is situated on average at an only slightly lower level.

The invention claimed is:

1. A process for preparing pressure sensitive adhesives based on acrylate hotmelt, in which a monomer mixture including at least the following monomers
   (a) 70 to 100% by weight of compounds selected from the group consisting of (meth)acrylic acid and the derivatives thereof corresponding to the following formula

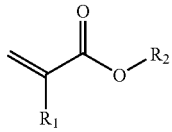

with $R_1$=H or $CH_3$ and $R_2$=an alkyl chain having 2 to 20 carbon atoms and also including
   (b) 0 to 30% by weight of olefinically unsaturated monomers containing functional groups
   and also including
   (c) optionally, further components
   is free-radically polymerized in solution in a reactor to give a polyacrylate, wherein
   I. the polymerization is initiated using at least one dissociating photoinitiator and by irradiation with ultraviolet light, the photoinitiator being added to the monomer mixture before the beginning of the polymerization and/or to the reaction mixture in the course of the polymerization,
   II. the polyacrylate is freed from the solvent,
   III. the polyacrylate is processed further in the melt.

2. The process of claim 1, wherein the at least one photoInitialor is or are used in an amount of from 0.1 to 2% by weight, based on the weight of the monomer mixture.

3. The process of claim 1, wherein the irradiation with ultraviolet light is carried out in the form of two or more irradiation cycles and/or pulsed irradiation is carried out.

4. The process of claim 1, wherein the free-radical polymerization is conducted at least up to a conversion of 98% of the monomers.

5. The process of claim 1, wherein the removal of the solvent is carried out after the polymerization in a twin-screw extruder.

6. The process of claim 1, wherein crosslinkers are added to the monomer mixture, to the reaction mixture or to the polyacrylate.

7. The process of claim 1, wherein resins and/or additives are added to the monomer mixture, to the reaction mixture or to the polyacrylate.

8. The process of claim 1, further comprising the step of applying the pressure sensitive adhesive from the melt to a backing material.

9. An adhesive tape provided with a layer of a self-adhesive prepared by the process of claim 1 on one or both sides.

10. The process of claim 2, wherein said at least one photoinitiator is used in an amount of between 0.25 and 1% by weight, based on the weight of the monomer mixture.

11. The process of claim 6, wherein said crosslinkers are selected from the group consisting of difunctional or polyfunctional acrylates, difunctional or polyfunctional methacrylates, difunctional or polyfunctional isocyanates, difunctional or polyfunctional epoxides, or mixtures thereof.

12. The process of claim 7, wherein said resins and/or adhesives are selected from the group consisting of ageing inhibitors, light stabilizers, ozone protectants, fatty acids, plasticizers, nucleating agents, blowing agents, accelerators and fillers.

* * * * *